Patented Mar. 15, 1949

2,464,751

UNITED STATES PATENT OFFICE 2,464,751

GRIGNARD REAGENT AND PROCESS FOR MAKING THE SAME

Frederick P. Richter, Woodbury, N. J., assignor to Socony-Vacuum Oil Company, Incorporated, a corporation of New York No Drawing. Application October 2, 1946, Serial No. 700,829

12 Claims. (Cl. 260—665)

This invention relates to a Grignard reagent derived from hydrocarbon wax and to a method for preparing the same. More particularly, the present invention is concerned with a Grignard reagent characterized by the presence of a long chain, high molecular weight alkyl group of the petroleum wax hydrocarbon range.

Organo-metallic compounds having an organic radical and a halogen atom each linked directly to the metal atom are usually referred to as mixed organo-metallic compounds. Such compounds, in which the metal atom is magnesium, have been designated as Grignard reagents. These reageants have generally been represented in the literature by the formula RMgX wherein R is an organic radical and X a halogen atom. Grignard reagents have heretofore been widely employed as intermediates in preparing a multitude of various organic compounds and an extremely large number of alkyl magnesium halides have been reported in the chemical literature. Such alkyl magnesium halides, however, have been those in which the alkyl group is of relatively short chain length and of comparatively low molecular weight. Thus, Grignard reagents having alkyl groups in the wax hydrocarbon range have not been heretofore described. This absence in the art of wax magnesium halides may be readily comprehended when it is noted that the methods generally employed in preparing the simpler alkyl halides for use in synthesizing Grignards are not applicable in preparing the higher molecular weight halides of petroleum wax hydrocarbons. Wax halide, in particular, chlorowax, is normally prepared by direct chlorination of petroleum wax, which results in a number of isomeric chloro derivatives, olefins by dehalogenation and dehydrohalogenation as well as oxygenated impurities. These materials have the apparent ability of interfering with initiation of the Grignard reaction which, even in many simple cases, is reluctant to start. Attempts to prepare Grignard reagents with the direct use of halogenated hydrocarbon waxes accordingly has been unsuccessful. In the case of the well known simpler alkyl magnesium halides, the alkyl halide intermediates are not usually prepared by direct halogenation but rather from other derivatives such as alcohols, for example. Furthermore, the simpler alkyl halides are capable of purification by simple physical means such as distillation, whereas petroleum wax halides are not generally amenable to any such purification process.

Now, in accordance with the present invention, there has been discovered a method for removing and deactivating interfering substances in the Grignard reaction of hydrocarbon wax halides. This method then affords a means for the synthesis of Grignard reagents having alkyl groups in the petroleum wax hydrocarbon range. The process of this invention comprises in its simplest aspects the preparation of a halogenated petroleum hydrocarbon wax, the purification of said halogenated wax by treatment with sulfuric acid to remove or render inert the aforementioned materials which interfere in the Grignard reaction and the preparation of the wax magnesium halide by contacting the purified halogenated wax with magnesium in the presence of a suitable solvent such as anhydrous ether.

The conversion of a petroleum wax hydrocarbon to a wax magnesium halide, in accordance with the process described herein, affords a useful method for the preparation of new wax derivatives since the wax magnesium halide of this invention is a true Grignard reagent and consequently can undergo the usual reactions characteristic of Grignards. For example, a wax carboxylic acid can be prepared by simply treating the wax magnesium halide obtained with carbon dioxide and acidifying the magnesium salt obtained. Similarly, by suitable reaction of the wax magnesium halide, primary, secondary and tertiary alcohols, mercaptans, nitriles, halides, thio acids, ketones, amides, modified hydrocarbons and the like, which are derivatives of petroleum wax, can be prepared. Furthermore, the long chain, high molecular weight of the wax group present in such derivatives modifies the physical and chemical properties of said compounds in comparison to the corresponding derivatives obtained from the previously known simpler Grignard reagents. Thus, the presence of the hydrocarbon wax grouping in various derivatives promotes the oil solubility thereof, rendering them attractive as starting materials in the synthesis of oil additives.

The halogenated wax, more particularly, chlorinated wax, used in synthesizing the present Grignard reagents may be prepared from paraffin waxes of melting point not substantially less than 120° F., having molecular weights in excess of about 250 and having more than about 20 carbon atoms in their molecules. While crystalline paraffin wax having the above characteristics may be derived from other sources, it is convenient to obtain it from petroleum by the usual methods. When the wax is melted and heated to about 200° F. or higher, chlorine is bubbled through it until the desired amount of chlorine is absorbed. The degree of chlorination of the chlorowax is of considerable importance and, for purposes of the present invention the amount of chlorine introduced will be such as to produce a substantially monochloro wax. Generally it is desirable to maintain the degree of chlorination so that the final chlorinated wax contains between about 5 and about 15 per cent and preferably between about 9.5 and about 10.5 per cent chlorine.

However, even under the most closely controlled conditions to obtain monochloro wax uncontaminated by the presence of unchlorinated wax or polychloro waxes, small quantities of these latter materials are present in the resultant chlorinated product. It is preferable, although not essential, to remove the undesired unchlorinated wax and polychloro waxes from the mixture to avoid undue contamination in the subsequent Grignard reaction. Such separation may be effected by taking advantage of the differing melting points of the various chlorinated waxes. Thus, the chlorination of most petroleum hydrocarbons lowers their melting points and up to a certain point, the greater the extent of chlorination, that is, the more chlorine atoms per molecule, the lower the melting point. The decrease in melting point is stepwise and this phenomenon thus affords a means of separating the unchlorinated wax from the monochloro wax and the monochloro wax from the higher chlorinated waxes. Thus, unchlorinated wax can be separated from the chlorination mixture by filter pressing at such temperatures that all of the chlorinated waxes are largely liquids while the unchlorinated waxes are largely solid. The temperature for the pressing operation will be dependent on the character of the initial wax and will vary considerably, depending on this factor. For example, at a temperature of from 80° F. to 90° F., the monochloro product formed by the chlorination of a petroleum wax having a melting point of about 120° F. will be liquid, while the unchlorinated wax will be solid, enabling a ready separation to be effected.

Solvent extraction methods may also be employed for separating unchlorinated wax from the chlorinated portions and for separating the monochloro wax from the more highly chlorinated portions. Thus, a mixture of mono- and polychloro waxes may be separated from each other crystallization from a suitable solvent such as acetone, methyl-ethyl ketone, benzene, and various chlorinated solvents. In preparing the solvent solution, an elevated temperature is employed to insure that the chloro waxes are completely dissolved in the solvent. The solution is then chilled to a temperature at which the monochloro wax precipitates while the polychloro waxes remain in solution. This temperature may readily be determined by a few trial runs. Thus, when a paraffin wax of about 120° F. melting point is used for the initial chlorination, a chilling temperature of from minus 15° F. to minus 20° F. will be adequate to cause precipitation of the monochloro waxes from the higher polychloro waxes. The precipitated monochloro waxes may then be readily separated by settling, filtering, or centrifuging.

The substantially monochloro wax, preferably freed from unchlorinated and polychlorinated waxes in accordance with the above procedure, is then treated with concentrated sulfuric acid by contacting the wax with a sufficient amount of acid to effect the formation of two immiscible phases; a lower sulfuric acid layer and an upper layer of chlorinated wax. If desired, the chlorowax before acid treatment may conveniently be dissolved in an inert hydrocarbon solvent, such as petroleum ether, to facilitate handling; however, this is not essential. Upon standing it is found that the sulfuric acid layer becomes considerably darkened and contains a black to brown sludge in solution. The sulfuric acid layer is then drawn off and the remaining chlorowax is washed with dilute aqueous sodium carbonate or other neutralizing agent and then with water until substantially neutral. The chlorowax or its solution is dried by suitable means, such as over anhydrous calcium chloride or similar material, filtered, and the solvent, if such was used, removed by heating, preferably under a reduced pressure. The purified chlorowax so obtained is practically colorless in contrast to the starting chlorowax, which is generally pale yellow to dark brown in color. The percentage of unsaturated materials in the chlorowax is also radically reduced as indicated by a substantially lower iodine number. The period of time during which the chlorowax is permitted to remain in contact with the sulfuric acid will be dependent on the strength of the sulfuric acid and on the character of the wax being treated. In general, the chlorinated wax will be allowed to remain in contact with the acid until the wax becomes substantially colorless and there is a substantial darkening of the sulfuric acid layer. Under the usual conditions the period required to obtain a clear-cut separation of the organic and acid layers will generally be between about ten minutes and about two hours. The step of contacting the chlorinated wax with sulfuric acid may either be a batch process as indicated or a stream or spray of sulfuric acid may be continuously supplied to the upper portion of a vessel containing the chlorinated wax, allowed to flow through said wax, and withdrawn from the bottom of said vessel, thus affording a substantially continuous method of purifying the chlorinated wax. The strength of sulfuric acid employed may be between about 80 per cent and about 100 per cent. Generally, however, sulfuric acid of concentration between about 95 and about 100 per cent will preferably be employed. The purified chlorowax obtained as a result of the above treatment is preferably preserved in the absence of light and air.

The Grignard reagent of this invention is then readily and conveniently prepared by contacting the purified chlorowax with magnesium in the presence of dry diethyl ether under usual Grignard reaction conditions. The commonly used solvent diethyl ether may be replaced by other ethers or tertiary amines. The reaction will be carried out in the absence of moisture and preferably under an atmosphere of nitrogen or other inert gas. In some instances, it is preferable to use a catalyst to initiate and accelerate the reaction. The catalysts generally employed in initiating Grignard reactions such as iodine, ethereal ethyl magnesium bromide, mercuric chloride, Gilman's catalyst, etc., were found to be effective in promoting the present Grignard reaction. During the course of the reaction, a voluminous white precipitate generally formed which was found to consist essentially of magnesium chloride undoubtedly formed by coupling of the wax magnesium chloride with unreacted chlorowax in accordance with the equation:

wax MgCl + wax Cl → wax—wax + MgCl$_2$

The magnesium chloride and other insoluble materials formed during the course of the reaction have a tendency to coat the surface of the magnesium and thus render it inert. To overcome this tendency it has accordingly been found desirable to add a small quantity of finely divided abrasive material, such as finely chipped glass, to the reaction vessel, thus maintaining the surface of the magnesium bright, clean, and highly reactive by contact with said abrasive matter. The Grignard reagent is not generally isolated at the completion of the reaction but may be used directly for the preparation of the desired petroleum wax derivative. Thus, if it is desired to prepare a wax carboxylic acid, the ethereal solution of Grignard reagent is charged with carbon dioxide, preferably by addition of Dry Ice. After acidification with mineral acid, the wax carboxylic acid can be readily isolated.

The following example will serve to illustrate the method of preparing petroleum wax magnesium halides in accordance with the present invention:

Seven hundred twenty-four parts by weight of a hydrocarbon wax, having a melting point of about 120° F. and containing approximately 26 carbon atoms per molecule, were chlorinated until 72.5 parts by weight of chlorine had been absorbed. The chlorinated wax was air-blown to remove hydrochloric and uncombined residual chlorine and then pressed at 85° F., thereby separating unchlorinated wax from the chlorinated products. The liquid portion so obtained was then dissolved in acetone, 350 parts of crude chlorowax being dissolved in 3226 parts of acetone. The solution was chilled to minus 18° F. and 185 parts by weight of solid monochlorowax containing 9.3 per cent chlorine were precipitated. The precipitate of monochlorowax was removed by filtration and intimately mixed with an equal weight of sulfuric acid (specific gravity 1.84). After standing for approximately one hour, the lower sulfuric acid layer was drawn off and was found to contain a dark-brown sludge in solution. The chlorowax was then washed successively with an equal volume of 5 per cent aqueous sodium carbonate and water until neutral to litmus. The purified chlorowax was then dried over calcium chloride to yield a practically colorless product. The percentage of unsaturated materials in the chlorowax was found to be radically reduced by treatment with sulfuric acid. Thus, before said treatment, the iodine number of the chlorowax was 17, while after treatment, the iodine number was 0.2.

The Grignard reagent was then prepared from the purified chlorowax by contacting 44.0 parts of the same with 3.1 parts by weight magnesium turnings in the presence of 100 parts by weight of anhydrous diethyl ether and 10–20 parts of finely divided chipped glass and about 0.2 part by weight of the above mentioned Gilman's catalyst. Magnesium turnings were first placed in the reaction vessel and warmed gently while anhydrous nitrogen gas was passed through the vessel to remove surface moisture. About 5 parts of the chlorowax dissolved in an equal weight of ether are then added to the magnesium, followed by addition of the catalyst. After warming and stirring, the reaction, as evidenced by the gradual consumption of the magnesium and clouding, was found to start in 5 to 6 minutes. The remaining chlorowax dissolved in the remaining ether was then added dropwise. The reaction mixture was then refluxed with stirring for about 5 hours until completion of the reaction and then cooled to room temperature.

That a Grignard reagent of wax magnesium chloride has been formed is proved by the following sensitive qualitative color test which is essentially the classical test for a Grignard reagent, a detailed description of which is to be found in literature [Journal of American Chemical Society 47, 2002 (1925) and 52, 4949 (1930)]:

Five-tenths of one milliliter of the ethereal solution of wax magnesium chloride was treated with 0.5 milliliter of a 1 per cent solution of Michler's ketone (4,4'-tetramethyldiamino-benzophenone) in dry benzene and then 1 milliliter of water was added slowly. Several drops of a 0.2 per cent solution of iodine in glacial acetic acid were then added, and the formation of a greenish-blue color constituted definite proof that a true wax Grignard reagent had originally been formed. The greenish-blue color developed is directly associated with a compound having a carbon-metal linkage and is due to the formation of a complex as indicated below:

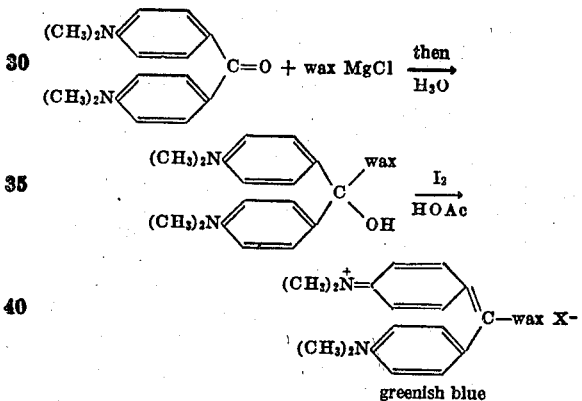

where X$^-$ is halide ion.

While chlorine and chlorowax have been referred to almost exclusively in the above discussion, it is to be understood that other of the halogens may be employed in preparing the corresponding halogenated wax and said halowax used in synthesizing the Grignard reagent in accordance with the process described herein. Thus, bromine, and iodine may suitably be used to obtain the corresponding bromo, and iodo waxes. The bromo compounds may be prepared by halogenating with bromine, using a halogen carrier, such as halides of antimony, phosphorus, iron, various metals and the like. The brominated mixture may then be separated into its components, as described above in the case of the chlorine compound, and the isolated, substantially monobromowax treated with sulfuric acid to yield a purified bromowax suitable for use in Grignard preparation. Similarly, iodine waxes may be prepared and treated by analogous methods. Indeed, the Grignard reagent is more easily formed with the use of iodo and bromo waxes than with chlorowax. However, the tendency for coupling between the wax magnesium halide and unreacted halogenated wax, as indicated above, also is facilitated. For this and economical reasons, the use of chlorine and chlorowax is preferred.

I claim:

1. A Grignard reagent characterized by a paraffin wax organic radical of more than about 20 carbon atoms.

2. A process for preparing a Grignard reagent from a halogenated paraffin wax, which comprises the steps of subjecting a substantially monohalogenated paraffin wax to treatment with concentrated sulfuric acid, removing the wax from contact with said acid and reacting the treated wax under Grignard reaction conditions with metallic magnesium.

3. A process for preparing a Grignard reagent from a halogenated paraffin wax, which comprises the steps of subjecting a substantially monochloroparaffin wax to treatment with concentrated sulfuric acid, removing the wax from contact with said acid and reacting the treated wax under Grignard reaction conditions with metallic magnesium.

4. A process for preparing a Grignard reagent from a halogenated paraffin wax, which comprises the steps of subjecting a substantially monohalogenated paraffin wax to treatment with concentrated sulfuric acid, removing the wax from contact with said acid, neutralizing the treated wax, drying the neutralized acid-treated wax and reacting the same under Grignard reaction conditions with metallic magnesium.

5. A process for preparing a Grignard reagent from a halogenated paraffin wax, which comprises the steps of subjecting a substantially monochloroparaffin wax to treatment with concentrated sulfuric acid, removing the wax from contact with said acid, neutralizing the treated wax, drying the neutralized acid-treated wax and reacting the same under Grignard reaction conditions with metallic magnesium.

6. A process for preparing a Grignard reagent from a halogenated paraffin wax, which comprises the steps of subjecting a chlorinated wax containing between about 5 and about 15 per cent by weight of chlorine to treatment with concentrated sulfuric acid, removing the wax from contact with said acid, neutralizing the treated wax, drying the neutralized acid-treated wax and reacting the same under Grignard reaction conditions with metallic magnesium.

7. A process for preparing a Grignard reagent from a halogenated paraffin wax, which comprises the steps of subjecting a chlorinated wax containing between about 9.5 and about 10.5 per cent by weight of chlorine to treatment with sulfuric acid of a concentration between about 95 and about 100 per cent, neutralizing the treated wax, drying the neutralized acid-treated wax and reacting the same under Grignard reaction conditions with metallic magnesium.

8. A process for preparing a Grignard reagent having a high molecular weight alkyl group of more than 20 carbon atoms, which comprises the steps of subjecting a substantially monohalogenated paraffin wax, containing more than about 20 carbon atoms per molecule, to treatment with concentrated sulfuric acid, removing the wax from contact with said acid, neutralizing the treated wax, drying the neutralized acid-treated wax and reacting the same under Grignard reaction conditions with metallic magnesium.

9. A process for preparing a Grignard reagent having a high molecular weight alkyl group of more than 20 carbon atoms, which comprises the steps of subjecting a substantially monochloroparaffin wax, containing more than about 20 carbon atoms per molecule, to treatment with sulfuric acid of concentration between about 95 and about 100 per cent, removing the wax from contact with said acid, neutralizing the treated wax, drying the neutralized acid-treated wax and reacting the same under Grignard reaction conditions with metallic magnesium.

10. A process for preparing a Grignard reagent from a halogenated paraffin wax, which comprises the steps of contacting a substantially monochloroparaffin wax with concentrated sulfuric acid for a period of between about 10 minutes and about 2 hours, removing the wax from contact with said acid, neutralizing the acid-treated wax and reacting the same, in the presence of diethyl ether and in the substantial absence of moisture, with metallic magnesium.

11. A process for preparing a Grignard reagent from a halogenated paraffin wax, which comprises the steps of contacting a solution of substantially monochloroparaffin wax in an inert solvent with concentrated sulfuric acid for a period of between about 10 minutes and about 2 hours, removing the wax solution from contact with said acid, neutralizing the acid-treated wax solution, separating the inert solvent therefrom and reacting the resulting wax, in the presence of diethyl ether and in the substantial absence of moisture, with metallic magnesium.

12. A Grignard reagent of wax magnesium chloride characterized by a paraffin wax organic radical of more than about 20 carbon atoms.

FREDERICK P. RICHTER.

REFERENCES CITED

The following references are of record in the file of this patent:

UNITED STATES PATENTS

| Number | Name | Date |
|---|---|---|
| 1,825,814 | Norris | Oct. 6, 1931 |
| 2,189,924 | Pier et al | Feb. 13, 1940 |

OTHER REFERENCES

Levene et al.: J. Bio. Chem. 20, 528–532.
Zoellner: Iowa St. Coll. J. Sci., 9, 213–4.
Gilman: Organic Chemistry, Wiley & Sons, New York (1938), pages 414 and 432.
Sachanen: Chem. Constituents of Petroleum, page 284.